United States Patent [19]
Hardewig et al.

[11] Patent Number: 5,564,057
[45] Date of Patent: Oct. 8, 1996

[54] MICROPROCESSOR ARCHITECTURE WHICH FACILITATES INPUT/OUTPUT UTILIZING PAIRS OF REGISTERS WHICH THE SAME ADDRESS

[75] Inventors: Clemens Hardewig, Braunschweig, Germany; Hans Zeidler, Hamburg, Germany

[73] Assignee: U.S. Philips Corporation, New York, N.Y.

[21] Appl. No.: 353,170

[22] Filed: Dec. 8, 1994

Related U.S. Application Data

[63] Continuation of Ser. No. 65,109, Mar. 10, 1993, abandoned.

[30] Foreign Application Priority Data

Mar. 17, 1992 [DE] Germany ..................... 42 08 459.8

[51] Int. Cl.⁶ ................................................. G06F 13/00
[52] U.S. Cl. ..................... 395/800; 395/427; 395/375; 395/821
[58] Field of Search ............................... 395/800, 425, 395/325, 375, 400; 364/DIG. 1

[56] References Cited

U.S. PATENT DOCUMENTS

| | | | |
|---|---|---|---|
| 4,811,202 | 3/1989 | Schabowski | 364/DIG. 1 |
| 4,980,819 | 12/1990 | Cushing et al. | 364/DIG. 1 |
| 5,228,130 | 7/1993 | Michael | 395/325 |
| 5,251,307 | 10/1993 | Sugiyama | 395/400 |
| 5,404,551 | 4/1995 | Katsuno | 395/800 |

OTHER PUBLICATIONS

Janacek et al., "Register Array Processor", *Microprocessing and Microprogramming*, Aug. 1987, pp.23–30.
PDµPD7720 from NEC.

Matoba et al., "Twin Register Architecture for AI Processor", IEEE, 1989, pp. 168–173

*Primary Examiner*—Alyssa H. Bowler
*Assistant Examiner*—Walter D. Davis
*Attorney, Agent, or Firm*—Anne E. Barschall

[57] ABSTRACT

In processors with a reduced set of instructions the operands are derived from registers or as by a directly indicated number from a section of the instruction word, the operation result being stored in a register so that processing can take place within one clock cycle. However, when input/output data from peripheral apparatus is processed, a loss of time occurs because these values must first be transferred from the main memory to the corresponding registers. Acceleration is possible by providing additional registers which exchange input/output data directly with the corresponding peripheral apparatus and which can be connected directly to the ALU. In order to enable addressing of these additional input/output registers, additional bits are used as an address extension in the instruction word, said bits switching over between registers of the same address in the two sets of registers. These address extensions occur preferably at bit positions within the instruction word which are at least partly not evaluated, for example as is the case in instructions for SPARC processors when the second operand is indicated by a register. A compatible extension for faster processing of input/output data is thus possible. When a further bit position is used for the control bit, direct numbers in the instruction word can be indicated also in the case of extension.

9 Claims, 1 Drawing Sheet

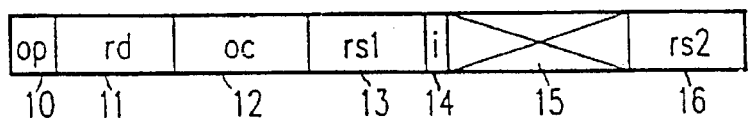
FIG. 1a
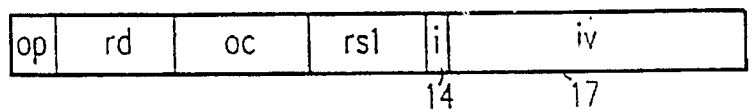
FIG. 1b
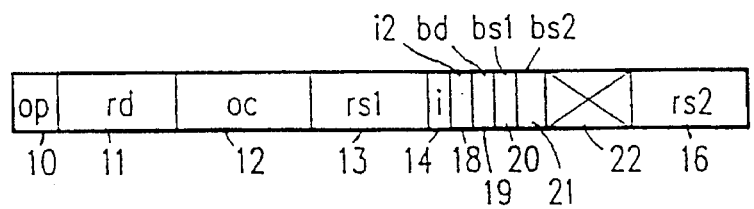
FIG. 2a
FIG. 2b
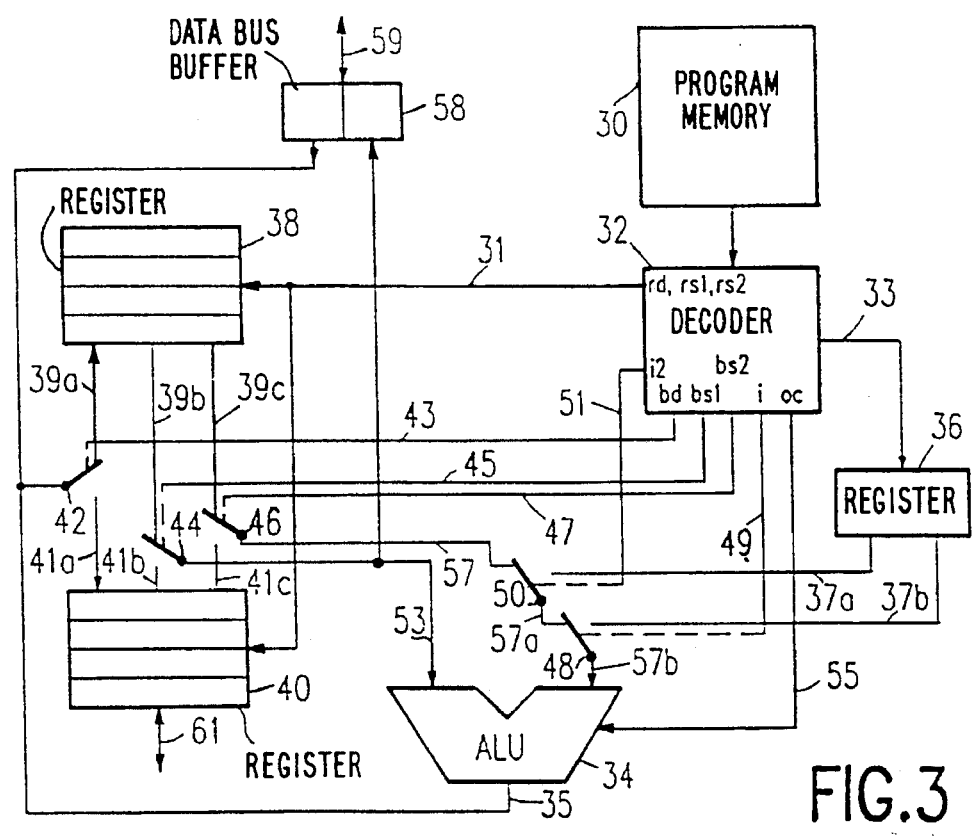
FIG. 3

MICROPROCESSOR ARCHITECTURE WHICH FACILITATES INPUT/OUTPUT UTILIZING PAIRS OF REGISTERS WHICH THE SAME ADDRESS

This is a continuation of application Ser. No. 08/065,109, filed on Mar. 10, 1993, now abandoned.

BACKGROUND OF THE INVENTION

The invention relates to a microprocessor for processing input/output data, comprising a number of first registers which operands which store operands, are addressable via addresses at first bit positions in instruction words, and can be connected to data paths within the processor, in order to exchange the operands with at least one ALU or, via an interface, with notably external data paths.

Microprocessors of this kind are generally known and can be subdivided essentially into two categories on the basis of their construction which manifests itself notably in respect of the structure and magnitude of the various instruction words; microprocessors with a large and complex set of instructions and microprocessors with a reduced set of instructions. The latter category includes the group of so-called SPARC or RISC processors which require only a very short execution time for the majority of the individual instructions. This is based inter alia on the fact that for a given category of instructions the processing of operands takes place only from registers of a general set of registers which are addressed via addresses in the instruction word, so that the operands are immediately available, i.e. within one clock cycle.

The processing of input data and output data for peripheral apparatus poses a given problem in such processors. Such input/output data is often directly written into or read from the main memory of the processor by a special control device, or use is made of separate input/output registers which can exchange data in the processor, via a general data bus, with, for example the main memory or other registers. When a data word of a peripheral apparatus is to be processed in the internal ALU it must first be transferred to a register of the general set of registers, so that time is lost. This has a significant effect notably when a large number of input/output data is to be processed.

A signal processor is known (PD μ PD 7720 from NEC) in which one instruction can address two registers, at least one of which may be a direct input/output register for direct data exchange with peripheral apparatus. However, such a register cannot be used for general purposes. Thus, an address is dedicated to an input/output register and hence is, not available for a general purpose register. Consequently, the number of general purpose registers that can be used for a given address length is reduced.

SUMMARY OF THE INVENTION

It is an object of the invention to provide a processor of the kind set forth which enables particularly fast processing of input/output dam, without the number of general purpose registers being reduced for a predetermined address length for these registers.

This object is achieved in accordance with the invention in that use is made of a number of second registers which exchange the input/output dam directly with peripheral apparatus, the second registers being controllable via the same addresses in the instruction word as for the first registers, and connectable to the internal data paths, the selection between first and second registers of the same address being made via bits in second bit positions of the instruction words, the second bit positions belonging to a section which is at least only conditionally evaluated for these instruction words.

The second registers thus constitute a linear extension of the first registers which is accessed essentially by the same addresses which have merely been extended by bits in the second bit positions in order to distinguish between the two register sets. The input/output data is thus directly accessible for processing, without special memory accesses in the main memory being required. The second bit positions are evaluated, for example only in the condition that the instruction word forms part of a predetermined subset of instruction words. Notably for said SPARC processors the section of the instruction word in which the second bit positions are situated is the section which is not evaluated when the second operand is contained in a register. An important condition is thus satisfied, i.e. the inclusion of the second registers and their addressing should still allow for the use of existing programs operating without the second registers. Evidently, the input/output data must then be processed in a different manner, for example via the main memory requiring a larger amount of time. The new microprocessor according to the invention and older microprocessors without second registers, therefore, form a family of microprocessors. Programs for the older members of this family can be run on all members of the family.

The selection of the registers can be controlled in various ways. Notably in the case of processors with a reduced set of instructions, where at least some of the instruction words contain addresses of several registers to indicate several operands which can be applied to or derived from an ALU via separate data paths, in an embodiment of the invention it is attractive to provide a separate second bit position for each address, the bit value at each second bit position generating a control signal which controls a switch connected to the relevant internal data path for the associated operands so that it connects this data path to a first or a second addressed register set. Because each address is thus unambiguously assigned to a given bit position in order to switch between the two sets of registers, decoding of the address extension is not necessary; the bit values at these bit positions can instead be used directly for address extension in that the control signals derived therefrom directly control switches which switch over data paths between the two sets of registers. It is thus ensured that a data word of input/output data can indeed be processed within one clock cycle.

In many processors one of the operands can be indicated either by an address in the instruction word for a register in which this operand is stored, or by a number directly contained in the instruction. The distinction between these two possibilities is made by the value of a bit in a given bit position in the instruction word. A bit position from among the positions used to represent the number may be used to select between the first and the second set of registers, but in this case the number cannot be processed directly. Another aspect of the invention enables numbers to be indicated as direct operands for the extended set of registers as well. This aspect is for processors where the one value of a bit in a third bit position of the instruction words indicates that one of the operands is formed by a number directly indicated in the instruction word, and the other value of this bit indicates that the operand is formed by the contents of a register. This aspect of the invention is characterized in that the bit value at the most-significant bit position of the direct number indicates, in the event of the other value of the bit at the third bit position, that instead of a register the operand is indicated by a direct number having a smaller number of positions in the instruction word. The second bit positions for the selection of the registers are the positions of next-lower significance of the direct number. In an extended set of registers two bits in the instruction word thus indicate whether one of the operands is indicated as an operand by a register address or directly by a number in the instruction. The range of numbers that can thus be indicated is smaller than without extension of the addressing for the extended set of registers, but still adequate for most practical cases.

BRIEF DESCRIPTION OF THE DRAWINGS

Embodiments of the invention will be described in detail hereinafter with reference to the drawing. Therein:

FIG. 1a) and 1b) show the composition of two instruction words for a known SPARC-type microprocessor, FIGS. 2a)and 2b) show two instruction words with extended addressing for an extended set of registers, FIG. 3 shows diagrammatically the most important elements of a processor with an extended set of registers.

DESCRIPTION OF THE PREFERRED EMBODIMENT

FIG. 1a) shows an instruction word which is composed of a number of sections. The section 10 contains an indication of which discriminates between different categories of instructions. The section 11 contains the address rd of a register which represents a destination register in which the result of the operation indicated by this instruction is to be stored. The section 12 contains the operation code which thus indicates in detail the operation to be executed by means of this instruction word. The section 13 contains the indication of a register rs1 which represents the source for a first operand to be processed.

The section 14 comprises one bit position and the value of the bit i indicates whether in the subsequent sections of the instruction word a second operand is indicated by a register address or by this operand itself. For the instruction word shown in FIG. 1a) it is assumed that i=0 and that hence the second operand is indicated by a register address rs2. In that case the section 15 is not evaluated and customarily contains bits having the value 0.

The instruction word shown in FIG. 1b) essentially has the same composition and deviates merely in that in the section 17, succeeding the bit position 14, an operand is indicated directly as a number iv, where i=1.

The instruction words shown in FIG. 1 thus concern three-address instruction words as used in SPARC processors enabling very fast processing. Each of the three register addresses rd, rs1 and rs2 comprises five bits, so that 32 registers can be addressed thereby. The number iv has 13 positions, so that the section 16, which is not evaluated when the register address rs2 is used for the second operand, comprises eight bits. For these instructions the operands relating to peripheral apparatus are loaded in advance from the input/output registers into the corresponding registers and are transferred to the input/output registers after execution of the instruction.

Processing can be accelerated when the data from external peripheral apparatus can be exchanged directly with registers which can also be directly accessed for the internal processing. Because the number of general registers addressed by the addresses rd, rs1 and rs2 is not to be reduced, this set of registers must be extended by additional input/output registers which take up directly data from and output data to peripheral apparatus. For the internal processing of the contents of these registers, however, the addressing of the registers, must be extended.

Such an extension is realized for the instruction words shown in FIG. 2. The sections 10 to 14 correspond to the corresponding sections of the instruction words shown in FIG. 1, as can be deduced also from the references used therein. The value of the bit i at the bit position 14 is assumed to be 0, which to begin with means that the second operand is indicated by a register address rs2 in the section 16. In order to enable all three addresses rd, rs1 and rs2 to be related, as desired, to the general registers or to the input/output registers, bit positions 19, 20, and 21 are provided. The value of the bit bd at the bit position 19 indicating whether the address rd relates to a general register or to an input/output register, the value of the bit bs1 at the bit position 20 determines whether the address rs1 relates to the one or the other set of registers. The value of the bit bs2 at the bit position 21 determines the set of registers whereto the address rs2 relates. The bits in the section 22, still remaining between the bit position 21 and the section 16 in the instruction word, are not evaluated. The significance of the bit i2 at the bit position 18 will be described hereinafter.

The instruction word shown in FIG. 2a) enables assignment of each of the three operands to be allocated to a general register or to an input/output register, that is to say in arbitrary combinations. This allows for very flexible processing of input/output data.

When the second operand is to be indicated as the direct number iv in the instruction, in the case of a full number of positions for this number iv there is no room for the additional bits for switching over the sets of registers. However, in order to enable switching over between the two sets of registers also in this case, the number of positions of the direct number is reduced a bit position 18 is provided for a bit i2 whose value indicates whether the second operand is indicated by a register address rs2 or by a direct, shortened number when the bit i=0. The case where in the event of the value of the bit i=1 a direct, non-shortened number is indicated as a second operand is maintained. In this case, there is no possibility of switching over the sets of registers for the other two operands. For the instruction word indicated in FIG. 2a) it is assumed that i=0 and i2=0. However, when the bit i2=1 at the bit position 18, the second operand should be indicated by a number directly in the instruction word. In this case, however, the bit bs2 at the bit position 21 is not required, because no register address rs2 is indicated for the second operand. Thus, the format of the instruction word as shown in FIG. 2b) is obtained. The bit position 21 in FIG. 2a) is now the most-significant position of the second operand iv1 indicated directly in the instruction word in the section 23; this can be unambiguously determined by combination of the bit values i and i2 in the bit positions 14 and 18. The switch-over bits bd and bs1 in the bit positions 19 and 20 are present merely for the register addresses rd and rs1. The number of positions of the directly indicated number iv1 is, therefore, three positions smaller than the directly indicated number iv in the instruction word shown in FIG. 1b). A processor with an extended set of registers and extended logic for processing the instruction words shown in FIG. 2 can also unambiguously and correctly process the instruction words shown in FIG. 1, in which case automatically only the general set of registers is used.

FIG. 3 shows diagrammatically the construction of the essential parts of a processor for processing the instruction words shown in FIG. 2. Instructions of a program are successively read from a program memory 30 so as to be applied to an instruction decoder 32. The instruction memory 30, for example, forms a part of a main memory and the connection to the instruction decoder 32 is shown herein as a direct connection for the sake of simplicity. In reality the connection extends via one of the internal data paths, as will be explained hereinafter. When an instruction word according to FIG. 2 is read from the program memory 30, the decoder outputs, via the connection 31, the addresses rd, rs1 and possibly rs2 of the registers in the sets of registers 38 or 40 wherefrom the operands to be processed are to be read or in which the processing result is to be written. The connection 31 is shown herein as a single line, but in reality consists of a number of parallel lines for each bit of each address. The same holds for the other data connections in FIG. 3.

Each time up to three registers can be simultaneously addressed in the sets of registers 38 and 40, one of these registers taking up operands supplied via an input 39a or 41a, and one or two registers delivering operands via the outputs 39b and 39c or 41b and 41c. The set of registers 38 is the general set of registers whereas the set of registers 40 comprises the input/output registers which, via the connection 61, directly receive dam from the peripheral apparatus, or apply data thereto.

The instruction decoder 32 evaluates the bits at the bit positions 14 and 18 and, when i=1, the section 17 of the instruction word is applied, via a connection 33, to a register 36 and, when i=0 and i2=1, the section 23 with a correspondingly smaller number of positions is applied to the register 36.

The operands are processed in the arithmetic and logic unit ALU 34 which receives two operands via the inputs 53 and 57b and which outputs the processing result via the output 35. The function of the ALU 34 is controlled, via the connection 55, by the instruction decoder 32 which decrypts the instruction code in the section 12 of the instruction.

Furthermore, from the bit values at the bit positions 19, 20 and 21 the instruction decoder 32 derives control signals which are applied, via control leads 43, 45 and 47, to switches 42, 44 and 46. When the bits at the bit positions 19, 20 and 21 have the value 0, because an instruction in conformity with FIG. 1a) is processed, where the non-evaluated section 15 contains only bits having the value 0, or an instruction in conformity with FIG. 2 is concerned where all operands are derived from or applied to the general set of registers 38 only, the switches 42, 44 and 46 occupy the upper position shown, so that the data paths 35, 53 and 57 are all connected to the general set of registers 38. However, when one of the bit positions 19, 20 or 21 contains a bit having the value 1, the corresponding switch 42, 44 or 46 is switched over and the corresponding data path 35, 53 or 57 is connected to the set of registers 40.

The data path 53 leads from the switch 44 directly to an input of the ALU 34 as well as to a data bus buffer 58 which is connected to an external data bus 59 and which applies, via this data bus, data words from one of the two sets of registers 38 or 40, depending on the position of the switch 44, for example to a main memory. Similarly, the data path 35 also leads to the data buffer 58 which applies data words arriving via the data bus 59 to one of the two sets of registers 38 or 40, depending on the position of the switch 42. Thus, registers of both sets of registers 38 and 40 can transtar and receive data via the external data bus 59. In fact via this external data bus 59 the instructions are also applied from the program memory 30 to the instruction decoder 32 which must be appropriately connected at the input side.

From the switch 46, however, the data path 57 leads to a further switch 50 which is controlled, via the control lead 51, by the instruction decoder 32 in dependence on the value of the bit i2 at the bit position 18. When i2=0, the switch 50 occupies the left-hand position shown, so that the second operand reaches the other input of the ALU 34 via the data path 57, the switch 50, the connection 57a and the switch 48 and the connection 57b. However, if i2=1, a direct number iv1 of the instruction according to FIG. 2b) is to be processed as the second operand, in which case the sets of registers 38 and 40 can still be switched over for the other two operands, the switch 50 is switched over via the control lead 51, thus connecting an out 37b with a smaller number of positions of the register 36, via the connection 57a, the switch 48 and the connection 57b, so the other input of the ALU 34. The most-significant position of this number, corresponding to the bit position 21 in the instruction according to FIG. 2a), can then control the switch 46 because the position thereof is irrelevant in this case.

However, if the bit i=1, the switch 48 is switched over via the control lead 49, so that the direct value with the complete number of positions is applied from the register 36, via an output 37a, to the ALU 34, via the connection 57a, in conformity with the instruction word shown in FIG. 1b).

Thus, in all cases, i.e. in the event of instruction words without register extension according to FIG. 1 or in the event of instruction words with register extension in conformity with FIG. 2, the ALU 34 always receives the correct operand on the relevant input or the operation result is always stored in the correct register.

We claim:

1. A microprocessor architecture for facilitating input/output, comprising:

means for storing an instruction word;

a number of first registers for storing operands, which first registers are addressable via addresses at first bit positions in the instruction word;

at least one ALU;

data paths connected between and for exchanging operands between the first registers and the ALU;

a number of second registers coupled to and for exchanging input/output data directly with peripheral apparatus, the second registers being addressable from the instruction word via the same address as the first registers, and connectable to the data paths for exchanging data with the ALU; and means, coupled to said means for storing and to pairs of said first and second registers, for detecting a predetermined non-input/output condition and for selecting, between the pairs of first and second registers, members of which pairs have a same address, in response to bits in second bit positions of the instruction word separate from the first bit positions, the second bit positions being located in a part of the instruction word which would otherwise only have been evaluated in response to the predetermined non-input/output condition, the second bit positions in the instruction word not causing additional machine cycles to retrieve values from the second bit positions.

2. The microprocessor of claim 1, wherein the microprocessor is a RISC microprocessor.

3. The microprocessor of claim 1, wherein the microprocessor is a SPARC microprocessor.

4. The microprocessor of claim 1 wherein the predetermined condition is that an operand is located in the instruction word rather than in the first registers.

5. A microprocessor architecture for facilitating input/output, comprising:

means for storing an instruction word;

a number of first registers for storing operands, which first registers are addressable via addresses at first bit positions in the instruction word;

at least one ALU;

data paths coupled between and for exchanging operands between the first registers and the ALU;

a number of second registers coupled to and for exchanging input/output data directly with peripheral apparatus, the second registers being addressable from the instruction word via the same address as the first registers, and connectable to the data paths for exchanging data with the ALU; and means coupled to said means for storing and coupled to and for selecting, between pairs of first and second registers, members of which pairs have a same address, in response to bits in second bit positions of the instruction word, the second bit positions being located in a part of the instruction word which would otherwise only have been evaluated in response to a predetermined condition, the second bit positions being in the instruction word making no additional machine cycles necessary to retrieve values from the second bit positions, wherein the instruction word contains several respective fields for addressing several respective ones of the first and second registers, each respective one of the first and second registers being for containing a respective operand for applying to or deriving from the ALU via a respective one of the data paths;

a respective second bit position for each of the respective fields; and further comprising a respective switch for each of the respective fields, each switch being responsive to a respective one of the second bit positions to connect the respective one of the data paths to the respective one of the first and second registers, the instructions using several register operands using the first and second registers simultaneously.

6. The microprocessor of claim 6, wherein the instruction word comprises a third bit position for indicating by a first value that one of the operands is formed by a number directly indicated in the instruction word; and by a second value that one of the operands is formed by contents of a register; and the directly indicated number is located in one of the respective fields which one of the respective fields includes a most significant bit position for indicating, in the case of the second value at the third bit position, that an operand in that one of the several fields is formed by a number which is nevertheless directly indicated in the instruction word, and has a smaller number of positions than the one of the several fields; and next lower significance bits for acting as the second bit positions; and remaining set of bits for containing the directly indicated number having the smaller number of positions.

7. A microprocessor architecture for facilitating input/output, comprising:

means for storing an instruction word, which instruction word includes a field which can either contain an operand or an address of a register;

at least one ALU;

a number of first registers for storing operands, which first registers are addressable via addresses at first bit positions in the instruction word separate from the field;

data paths coupled between and for exchanging operands between the first registers and the ALU;

a number of second registers coupled to and for exchanging input/output data directly with peripheral apparatus, the second registers being addressable from the instruction word via the addresses used for the first registers, and connectable to the data paths for exchanging data with the ALU; and means, coupled to said means for storing and coupled to pairs of said first and second registers, for detecting noninput/output operations and for selecting, between the pairs of first and second registers, members of which pairs have a same address, in response to at least one bit in the field otherwise used for the non-input/output operations, the at least one bit in the instruction word not causing additional machine cycles to retrieve the at least one bit.

8. The microprocessor of claim 7, wherein the microprocessor is a RISC microprocessor.

9. The microprocessor of claim 7, wherein the microprocessor is a SPARC microprocessor.

\* \* \* \* \*